United States Patent
Chen

(10) Patent No.: US 11,272,477 B2
(45) Date of Patent: Mar. 8, 2022

(54) METHOD OF DETERMINING POSITION OF PAGING MESSAGE, COMMUNICATION DEVICE, NETWORK-SIDE DEVICE AND USER EQUIPMENT

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/969,898

(22) PCT Filed: Feb. 3, 2019

(86) PCT No.: PCT/CN2019/074676
§ 371 (c)(1),
(2) Date: Aug. 13, 2020

(87) PCT Pub. No.: WO2019/158016
PCT Pub. Date: Aug. 22, 2019

(65) Prior Publication Data
US 2021/0014824 A1 Jan. 14, 2021

(30) Foreign Application Priority Data
Feb. 13, 2018 (CN) .......................... 201810150976.5

(51) Int. Cl.
*H04W 68/00* (2009.01)
*H04W 68/02* (2009.01)
(Continued)

(52) U.S. Cl.
CPC .......... *H04W 68/02* (2013.01); *H04W 72/04* (2013.01); *H04W 76/28* (2018.02)

(58) Field of Classification Search
CPC ..... H04W 68/02; H04W 76/28; H04W 72/04; H04W 68/005; H04W 72/0446;
(Continued)

(56) References Cited

U.S. PATENT DOCUMENTS

2014/0185475 A1  7/2014 Ji et al.
2016/0128020 A1  5/2016 Agarwal et al.
(Continued)

FOREIGN PATENT DOCUMENTS

CN  101998271 A    3/2011
CN  102843768 A  * 12/2012  ............ H04W 68/02
(Continued)

OTHER PUBLICATIONS

Extended European Search Report for related Application No. 19754712.8; reported on Mar. 24, 2021.
(Continued)

*Primary Examiner* — Tanmay K Shah
(74) *Attorney, Agent, or Firm* — von Briesen & Roper, s.c.

(57) ABSTRACT

A method of determining a position of a paging message, a communication device, a network-side device, and a user equipment are provided. The method of determining a position of a paging message includes determining a position of a paging message on a communication resource, where the location causes paging occasions of two consecutive paging messages to use different communication resources, and the communication resource includes at least one of following: a time-domain resource, a frequency-domain resource, a spatial domain resource, a code-domain resource.

19 Claims, 4 Drawing Sheets

Determining a position of a paging message on a communication resource, where the position causes paging occasions of two consecutive paging messages to use different communication resources, and the communication resource includes at least one of following: a time-domain resource, a frequency-domain resource, a spatial domain resource, a code-domain resource ~101

(51) Int. Cl.
*H04W 76/28* (2018.01)
*H04W 72/04* (2009.01)

(58) Field of Classification Search
CPC ......... H04W 72/0453; H04W 72/0466; H04W 72/046; H04B 7/0697; H04L 5/0005; H04L 5/0023; H04L 5/0016; H04L 5/0053
USPC .......................................................... 455/458
See application file for complete search history.

(56) References Cited

U.S. PATENT DOCUMENTS

| | | |
|---|---|---|
| 2017/0280473 A1 | 9/2017 | Krishnamoorthy et al. |
| 2018/0034605 A1 | 2/2018 | Fang et al. |
| 2019/0182784 A1 | 6/2019 | Harada et al. |
| 2019/0357170 A1* | 11/2019 | Liu .................. H04W 48/12 |
| 2020/0077362 A1 | 3/2020 | Liu |

FOREIGN PATENT DOCUMENTS

| | | |
|---|---|---|
| CN | 102843768 A | 12/2012 |
| CN | 104936183 A | 9/2015 |
| CN | 107223357 A | 9/2017 |
| WO | 2016073118 A1 | 5/2016 |
| WO | 2018025946 A1 | 2/2018 |

OTHER PUBLICATIONS

Nokia, Nokia Shanghai Bell, "Downlink aspects of TDD support in NB-IoT", Nov. 27-Dec. 1, 2017, 3GPP TSG RAN WG1 Meeting #91, Reno, USA.
ZTE, "Issues for Paging in NB-IoT", Feb. 15-19, 2016, 3GPP TSG RAN WG2 Meeting #93, St. Julian's, Malta.
International Search Report & Written Opinion related to Application No. PCT/CN2019/074676; reported on Aug. 27, 2020.

* cited by examiner

Determining a position of a paging message on a communication resource, where the position causes paging occasions of two consecutive paging messages to use different communication resources, and the communication resource includes at least one of following: a time-domain resource, a frequency-domain resource, a spatial domain resource, a code-domain resource ~101

FIG.1

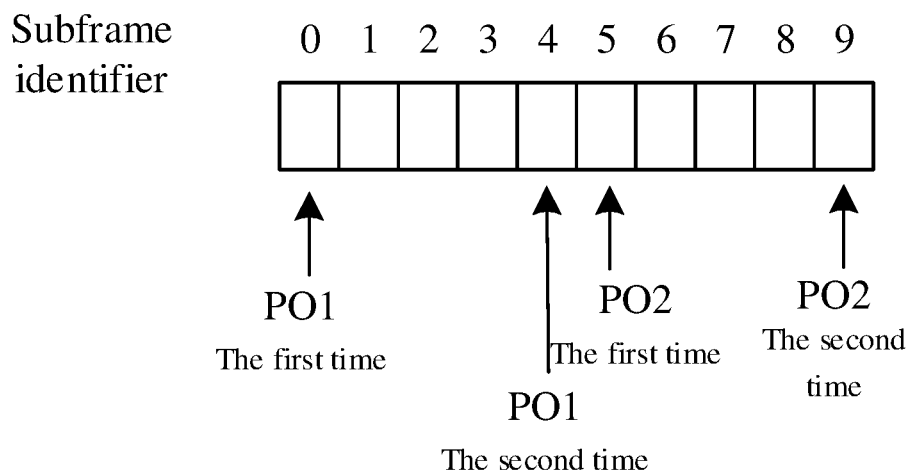

FIG.2

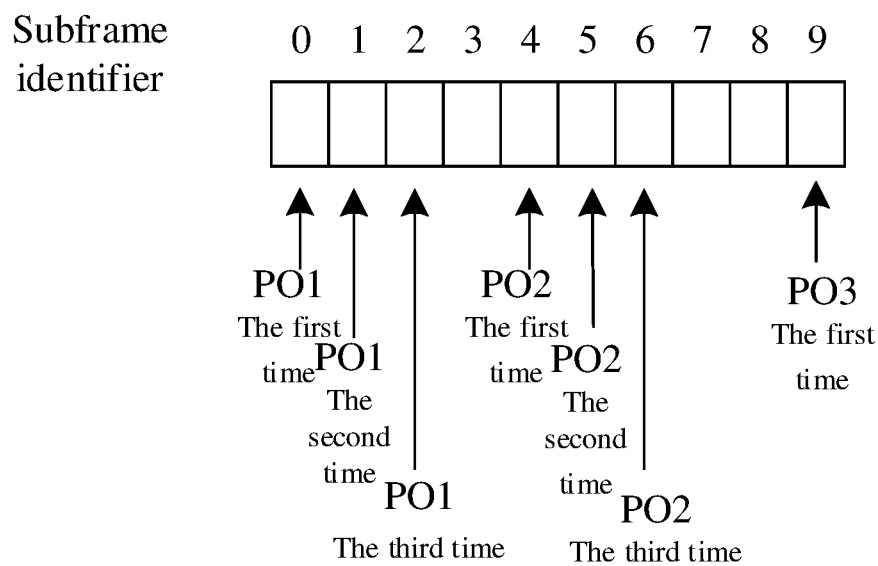

FIG.3

METHOD OF DETERMINING POSITION OF PAGING MESSAGE, COMMUNICATION DEVICE, NETWORK-SIDE DEVICE AND USER EQUIPMENT

CROSS-REFERENCE TO RELATED APPLICATION

This patent application is a 35 USC § 371 U.S. national stage of International Application No. PCT/CN2019/074676 filed on Feb. 3, 2019, which claims a priority to Chinese Patent Application No. 201810150976.5 filed in China on Feb. 13, 2018, the disclosures of which are incorporated in their entirety by reference herein.

TECHNICAL FIELD

The present disclosure relates to the field of communications technology, in particular, relates to a method of determining a position of a paging message, a communication device, a network-side device, and a user equipment.

BACKGROUND

In a Fifth Generation (5 Generation, 5G) mobile communication system in future, high-frequency communication and large-scale antenna technology will be introduced in order to achieve a target that a downlink transmission rate reaches 20 Gbps and an uplink transmission rate reaches 10 Gbps. High-frequency communication can provide a wider system bandwidth, and an antenna size can also be smaller, which is more advantageous for a deployment of a large-scale antenna in base stations and user equipments (User Equipment, UE). The high-frequency communication has disadvantages of a large path loss, a large interference and a fragile link, and large-scale antenna technology can provide large antenna gain, whereas, a combination of the high-frequency communication and the large-scale antenna is an inevitable trend of the 5G mobile communication system in future.

However, use of the large-scale antenna technology cannot solve all of problems of high-frequency communication, such as link vulnerability. When an occlusion is encountered in the high-frequency communication, data cannot be efficiently transmitted. Therefore, when a terminal in an idle state receives a paging message, a network-side uses beam-sweeping (beam sweeping) to transmit the paging message in order to enable the terminal to receive the paging message within one paging cycle as much as possible, thereby improving reliability of a link.

In a Long Term Evolution (LTE) system, a time-domain position at which a network-side sends and a terminal-side receives a paging message is determined by a paging frame (Paging Frame, PF) and a Paging Occasion (Paging Occasion, PO).

In a New Radio (New Radio, NR), one PO will last for a period of time (several sub-frame, or several slots) due to beam-sweeping, a PO calculation method of the LTE may result in a situation where two consecutive POs overlap, causing a user equipment to fail to correctly receive data due to paging collision.

SUMMARY

A technical problem to be solved by the present disclosure is to provide a method of determining a position of a paging message, a communication device, a network-side device, a user equipment. The present disclosure can avoid overlapping of two consecutive paging messages, and avoid a situation that a user equipment cannot correctly receive data due to paging collision.

In order to solve the above technical problem, embodiments of the present disclosure provide technical solutions as follow.

In a first aspect, an embodiment of the present disclosure provides a method of determining a position of a paging message. The method includes: determining a position of a paging message on a communication resource, where the position causes paging occasions of two consecutive paging messages to use different communication resources, and the communication resource includes at least one of following: a time-domain resource, a frequency-domain resource, a spatial domain resource, a code-domain resource.

In a second aspect, an embodiment of the present disclosure provides a communication device. The communication device includes: a processing module, used for determining a position of a paging message on a communication resource, where the position causes paging occasions of two consecutive paging messages to use different communication resources, and the communication resource includes at least one of following: a time-domain resource, a frequency-domain resource, a spatial domain resource, a code-domain resource.

In a third aspect, an embodiment of the present disclosure provides a user equipment. The user equipment includes a storage, a processor and a computer program stored on the storage and executable by the processor, wherein when the computer program is executed by the processor, the processor implements the steps of the method of determining a position of a paging message provided above.

In a fourth aspect, an embodiment of the present disclosure provides a network-side device. The network-side device includes a storage, a processor and a computer program stored on the storage and executable by the processor, wherein when the computer program is executed by the processor, the processor implements the steps of the method of determining a position of a paging message provided above.

In a fifth aspect, an embodiment of the present disclosure provides a computer readable storage medium having a computer program stored thereon, wherein when the computer program is executed by the processor, the processor implements the steps of the method of determining a position of a paging message provided above.

The embodiments of the present disclosure have the following beneficial effects.

In the above solutions, the position of the paging message on the communication resources is determined, and the same communication resource are avoided from being used for the paging occasions of two consecutive paging messages, the communication resources include time-domain resources, frequency-domain resource, spatial domain resources and code-domain resources. Through the technical solutions of the present disclosure, overlapping of two consecutive paging messages can be avoided, so as to avoid that a user equipment cannot correctly receive data due to paging collision.

BRIEF DESCRIPTION OF THE DRAWINGS

FIG. 1 is a flow chart of a method of determining a position of a paging message according to an embodiment of the present disclosure;

FIGS. 2-5 are schematic diagrams of determining a position of a paging occasion according to specific embodiments of the present disclosure;

DETAILED DESCRIPTION

Figure 4:
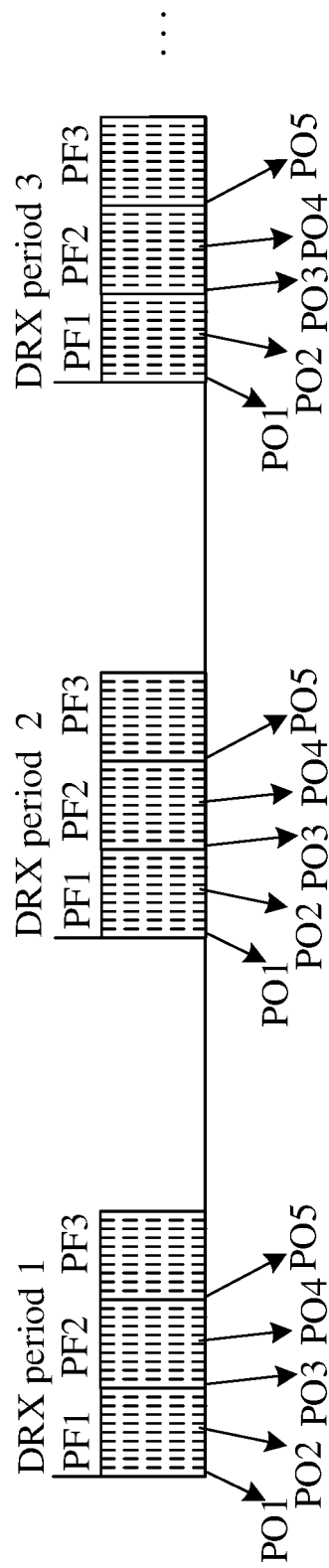

The technical solutions in the embodiments of the present disclosure will be clearly and completely described in conjunction with the accompanying drawings hereinafter. It is obvious that the described embodiments are only a part, rather than all, of the embodiments in the present disclosure. Based on the embodiments in the present disclosure, all other embodiments obtained by those of ordinary skill in the art without making creative efforts are within the protection scope of the present disclosure.

In a LTE system, a time-domain position where a network-side device transmits a paging and a user equipment receives the paging message is determined by a PF and a PO. A frame number SFN of the PF is determined by a following formula:

$$SFN \bmod T = (T \operatorname{div} N)*(UE\_ID \bmod N)$$

A position of the PO in the PF is determined by combining, with a preset table, i_s calculated from the following formula:

$$i\_s = \operatorname{floor}(UE\_ID/N) \bmod Ns$$

The UE_ID is (international mobile subscriber identification number (International Mobile Subscriber Identification Number, IMSI) of the user equipment receiving the paging message) MOD 1024, that is, according to the IMSI, The UE_ID may be divided into 1024 groups; T is a discontinuous reception (Discontinuous Reception, DRX) period having a value selected from (rf32, rf64, rf128, rf256), T may be configured by a radio resource control (Radio, Resource Control, RRC) layer, N=min (T, nB), Ns=max (1, nB/T), and a value of nB is selected from (4T, 2T, T and T/2, T/4, T/8, T/16, T/32).

In the NR, one PO will last for a period of time (several sub-frame, or several slots) due to the beam-sweeping, a PO calculation method of the LTE may result in a situation where two consecutive POs overlap, causing a user equipment to fail to correctly receive data due to paging collision.

Embodiments of the present disclosure provide a method of determining a position of a paging message, a communication device, a network-side device, and a user equipment, which can avoid overlapping of two consecutive paging messages, so as to avoid a situation that a user equipment cannot correctly receive data due to the paging collision.

An embodiment of the present disclosure provides a method of determining the position of a paging message, as shown in FIG. 1, the method includes a step 101.

Step 101: determining a position of a paging message on a communication resource, where the position causes paging occasions of two consecutive paging messages to use different communication resources, and the communication resource includes at least one of the following: a time-domain resource; a frequency-domain resource; a spatial domain resource; a code-domain resource.

In this embodiment, the position of the paging message on the communication resources is determined, and the same communication resource are avoided from being used for the paging occasions of two consecutive paging messages, the communication resources include time-domain resources, frequency-domain resource, spatial domain resources and code-domain resources. Through the technical solution of the present disclosure, overlapping of two consecutive paging messages can be avoided, so as to avoid that a user equipment cannot correctly receive data due to paging collision.

Further, the method specifically includes at least one of the following: determining a position of a paging occasion of a paging message on a time-domain resource, and avoiding overlapping of paging occasions of two consecutive paging messages on time-domain resources; allocating different frequency-domain resources for the two consecutive paging messages; allocating different spatial domain resources for the two consecutive paging messages; allocating different code-domain resources for the two consecutive paging messages.

Further, determining a position of a paging occasion of a paging message on a time-domain resource includes: determining the position of the paging occasion of the paging message on the time-domain resource according to a duration of the paging occasion of the paging message, and avoiding overlapping of paging occasion of the two consecutive paging messages on the time-domain resource; or determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource.

Further, the original position includes an original starting position, and adjusting the position of the paging occasion of the paging message on the time-domain resource includes: if a duration of a paging occasion of a previous paging message occupies the original starting position of a paging occasion of a next paging message, changing the starting position of the paging occasion of the next paging message to one of the following: a first subframe or a first slot available for transmitting a paging message next to an end of the paging occasion of the previous paging message; a first subframe or a first slot available for transmitting the paging message next to an end of the paging occasion of the previous paging message.

Further, beam-sweeping is performed in the paging occasion of the paging message on the occupied communication resource.

The beam-sweeping in the paging occasion of the paging message enables occupation of a sub-frame or slot other than a sub-frame or a slot available for transmission of a paging message, or the beam-sweeping in the paging occasion of the paging message enables only occupation of a sub-frame or a slot other than a sub-frame or a slot available for transmission of a paging message.

Further, the determining the position of the paging occasion of the paging message on the time-domain resource includes: determining identification information i_s of a time-domain position of the paging occasion of the paging message within all paging frames of a discontinuous reception period; determining a position of the paging occasion on the time-domain resource according to mapping relationship between the identification information i_s of the time-domain position and the position or the starting position of the paging occasion; wherein the identification information i_s of the time-domain position of the paging occasion of the paging message within all paging frames of a discontinuous reception period is calculated in at least one of the following manners: 1) calculating a first ratio of an identifier of a user equipment to a first quantity, the first quantity being a minimum of a paging density and a discontinuous reception period; after rounding down the first ratio, performing a modulus operation on a sum of the positions of the paging occasions in all paging frames in the discontinuous reception period to obtain identification information i_s of a time-domain position of a paging occasion; 2) calculating a first ratio of the identifier of the user equipment to the first quantity, the first quantity being the minimum of the paging density and the discontinuous reception period, calculating the ratio of Ns to the duration of the paging occasion as a second ratio, and after rounding down the first ratio, performing a modulus operation on the second ratio being rounded up, to obtain the identification information i_s of the time-domain position of the paging occasion, wherein Ns is the maximum of 1 and a ratio of a paging density to a discontinuous reception period; 3) calculating a first ratio of the identifier of the user equipment to the first quantity, the first quantity being the minimum of the paging density and the discontinuous reception period; calculating the ratio of Ns to the duration of the paging occasion as a second ratio, and after rounding down the first ratio, performing a modulus operation on the second ratio being rounded down, to obtain the identification information i_s of the time-domain position of the paging occasion.

It should be noted that, when determining the time-domain position of the paging occasion according to the identifier of the user equipment, the used identifier (UE ID) of a user equipment may correspond to a unique user equipment or correspond to a plurality of different user equipments. In addition, the used identifier UE ID of a user equipment may be either a complete user equipment identifier UE_ID or a truncated part of an identifier of a user equipment. In a specific implementation, the identifier of the user equipment can be determined according to the complete user equipment identifier UE_ID. More specifically, the user equipment identifier UE_ID may be taken to be one of an international mobile subscriber identification number (International Mobile Subscriber Identification Number, IMSI), a system architecture evolution temporary mobile subscriber identity (System Architecture Evolution (SAE) Temporary Mobile Subscriber Identity, S-TMSI) a temporary mobile subscriber identity (Temporary Mobile Subscriber Identity, TMSI), a Packet-TMSI (P-TMSI), a configured ID (Configured ID) (for example, through a release for idle), a resume ID (Resume ID), a cell radio network temporary identifier (Cell Radio Network Temporary Identifier, C-RNTI) or the like.

Further, after determining the identification information i_s of the time-domain position of the paging occasion, the method further includes: superimposing a preset offset on the identification information i_s of the time-domain position or the mapped position of the paging occasion, to obtain the position of the paging occasion on time-domain resources, wherein a method of obtaining the offset includes at least one of the following: explicit or implicit configuration by a network-side device; calculation using the identifier of the user equipment; determining according to a paging order.

In a further aspect, the sum of positions of a paging occasion within all paging frames within a discontinuous reception period is determined accord to the duration of the paging occasion. When the network-side device configures the sum of the positions of the paging occasion in all paging frames in the discontinuous reception period, the network-side device needs to consider a duration of a paging occasion, so as to ensure that there is no overlap between the two consecutive paging occasions.

Further, the allocating different frequency-domain resources for the two consecutive paging messages includes: allocating different frequency-domain resources for the two consecutive paging messages according to the identifier of the user equipment or an identifier of a group in which the user equipment is located.

It should be noted that, when determining the time-domain position of the paging occasion according to the identifier of the user equipment, the used identifier (UE ID) of a user equipment may correspond to a unique user equipment or correspond to a plurality of different user equipments. In addition, the used identifier UE ID of a user equipment may be either a complete user equipment identifier UE_ID or a truncated part of an identifier of a user equipment. In a specific implementation, the identifier of the user equipment can be determined according to a complete user equipment identifier UE_ID. More specifically, the user equipment identifier UE_ID may be taken to be one of an IMSI, a SAE, a TMSI, a Packet-TMSI (P-TMSI), a Configured ID (for example, through a release for idle), a Resume ID, a Cell Radio Network Temporary Identifier (C-RNTI) or the like.

Further, the allocating different spatial domain resources for the two consecutive paging messages includes: allocating different spatial domain resources for the two consecutive paging messages according to the identifier of the user equipment or the identifier of a group in which the user equipment is located, wherein the spatial domain resources include at least one of the following: a beam resource, a reference signal resource, a physical resource block resource, a bandwidth part resource, a baseband resource, a frequency point resource.

It should be noted that, when determining the time-domain position of the paging occasion according to the identifier of the user equipment, the used identifier (UE ID) of a user equipment may correspond to a unique user equipment or correspond to a plurality of different user equipments. In addition, the used identifier UE ID of a user equipment may be either a complete user equipment identifier UE_ID or a truncated part of an identifier of a user equipment. In a specific implementation, the identifier of the user equipment can be determined according to the complete user equipment identifier UE_ID. More specifically, the user equipment identifier UE_ID may be taken to be one of an IMSI, a SAE, a TMSI, a Packet-TMSI (P-TMSI), a Configured ID (for example, through a release for idle), a Resume ID, a Cell Radio Network Temporary Identifier (C-RNTI) or the like.

Further, the allocating different code-domain resources for the two consecutive paging messages includes: allocating different code words or different groups to the two consecutive paging messages according to an identifier of a user equipment or an identifier of a group in which a user equipment is located.

It should be noted that, when determining the time-domain position of the paging occasion according to the identifier of the user equipment, the used identifier (UE ID) of a user equipment may correspond to a unique user equipment or correspond to a plurality of different user equipments. In addition, the used identifier UE ID of a user equipment may be either a complete user equipment identifier UE_ID or a truncated part of an identifier of a user equipment. In a specific implementation, the identifier of the user equipment can be determined according to the complete user equipment identifier UE_ID. More specifically, the user equipment identifier UE_ID may be taken to be any one of an IMSI, a SAE, a TMSI, a Packet-TMSI (P-TMSI), a Configured ID (for example, through a release for idle), a Resume ID, a Cell Radio Network Temporary Identifier (C-RNTI) or the like.

Further, a method of obtaining the duration of the paging occasion includes at least one of the following: configuration from a network-side device; determining by a user equipment according to a beam-sweeping pattern; determining by a user equipment according to a configured paging parameter.

Further, after the user equipment determines the duration of the paging occasion, the duration of the paging occasion is reported to the network-side device.

The method of calculating a paging occasion provided by the present disclosure is applicable to the network-side device and the user equipment. The method of calculating the paging occasion provided in the present disclosure is described below with reference to the drawings and specific embodiments.

First Specific Embodiment

In this embodiment, by calculating the position of the paging occasion of a paging message on the time-domain resource, it is avoided that the paging occasions of the two consecutive paging messages overlap on the time-domain resource.

First, a starting position of a PO is calculated according to an LTE calculation method, and a transmitting position of a paging message is determined according to a length of the PO, wherein, the length of the PO may be as follows: 1) be configured by the network side device; 2) be determined by the user equipment according to a beam-sweeping pattern, a paging parameter configuration of the user equipment, etc., or further be reported to the network-side device.

If a PO duration of a previous paging message occupies a starting position of a PO of a next paging message, then the starting position of the PO of the next paging message is postponed according to a sub-frame or a slot subsequently available for transmitting the paging message. Specifically, the starting position of the PO of the next paging message is changed to the first sub-frame or slot available for transmitting the paging message after a PO end of the previous paging message.

In a specific example, if a predefined subframe or slot number available for transmitting the paging message is 0, 4, 5, 9, then the starting position of the PO of the next paging message can be postponed in two cases.

First case: if sweeping is only allowed to occupy a sub-frame or a slot available for transmitting a paging message, that is, beam-sweeping of a PO can only be performed on a pre-defined sub-frame or slot available for transmitting a paging message, the starting-position is postponed as follows:

As shown in FIG. 2, a beam-sweeping duration of a PO is two sub-frames, and a starting position of the PO originally calculated is a sub-frame numbered 0, a sub-frame numbered 4, a sub-frame numbered 5, and a sub-frame numbered 9. Since the duration of the PO is two sub-frames, first sweeping of a first PO, i.e. PO1, will occupy the sub-frame numbered 0, and second sweeping of the PO1 will occupy the sub-frame numbered 4, which overlaps with a position of first sweeping of the second PO, i.e., PO2. Thus, the position of the first-sweeping of the PO2 needs to be postponed. After being postponed, first sweeping of the PO2 will occupy the sub-frame numbered 5, and second sweeping of PO2 will occupy the subframe number 9.

Second case: if the sweeping is allowed to occupy a sub-frame or slot other than the sub-frame or slot available for transmitting a paging message, i.e. except the starting position, subsequent sweeping of the PO can be performed on any sub-frame or slot, the starting-position is postponed as follows.

As shown in FIG. 3, a beam-sweeping duration of a PO is three sub-frames, and the starting position of the PO calculated originally is a sub-frame numbered 0, a sub-frame numbered 4, a sub-frame numbered 5, and a sub-frame numbered 9. Since the duration of the PO is three sub-frames, first sweeping of a first PO, i.e. the PO1, will occupy the sub-frame numbered 0, and second sweeping of the PO1 will occupy the sub-frame numbered 1, third sweeping of the PO 1 will occupy the sub-frame numbered 2; first sweeping of the second PO, i.e., the PO2, will occupy the sub-frame numbered 4, second sweeping of the PO2 will occupy the sub-frame numbered 5, third sweeping of the PO2 will occupy the sub-frame numbered 6, and the second sweeping of the PO2 overlaps with an original position of first sweeping of the third PO, i.e., the PO3, thus, the position of the first sweeping of the PO3 needs to be postponed. The first sweeping of the PO3 will occupy the sub-frame numbered 9, i.e. the PO3 would start sweeping from the sub-frame numbered 9, after being postponed.

Second Specific Embodiment

In this embodiment, by calculating the position of the paging occasion of a paging message on the time-domain resource, it is avoided that the paging occasions of the two consecutive paging messages overlap on the time-domain resource.

In this embodiment, all paging frames in one DRX are obtained, and positions of POs are uniformly calculated in all the paging frames. The identification information $i\_s$ of the time-domain positions of a PO within all the paging frames in one DRX period is calculated according to at least one of following formulas.

$$i\_s = \text{floor}(UE\_ID/N) \bmod (Ns * \text{number of PF});$$

$$i\_s = \text{floor}(UE\_ID/N) \bmod X;$$

$$i\_s = \text{floor}(UE\_ID/N) \bmod \text{ceil}(Ns/L);$$

$$i\_s = \text{floor}(UE\_ID/N) \bmod \text{floor}(Ns/L)$$

Wherein, the UE_ID is a truncated part of an international mobile subscriber identity IMSI of a user equipment receiving a paging message, N is min (T, nB), Ns is max (1, NB/T), nB is a paging density, T is a discontinuous reception period, a value of the T is selected from (rf32, rf64, rf128, rf256), X is the sum of positions of paging occasions within all paging frames within one discontinuous reception period, and L is a duration of a paging occasion.

The network-side device needs to consider the duration of a PO when configuring X, so as to ensure that there is no overlap of two consecutive POs, and the position of a PO calculated according to the above formula is a uniform number of all PFs in one DRX.

After i_s is calculated, the position of the PO on a time-domain resource is determined according to mapping relationship between the identification information i_s of a time-domain position and the position or the starting position of the PO.

The PFs may be continuous within one DRX or may be separated.

As shown in FIG. 4, one DRX includes three consecutive PFs, i.e., a PF1, a PF2 and a PF3, respectively, positions of a PO in the PF1, the PF2 and the PF3 can be calculated according to the above formulas by taking the PF1, the PF2 and the PF3 as a whole, and positions of PO1, PO2, PO3, PO4 and PO5 in the PF1, the PF2 and the PF3 are obtained, and there was no overlap of any two POs of the PO1, the PO2, the PO3, the PO4 and the PO5. After the positions of the PO1, the PO2, the PO3, the PO4 and the PO5 are calculated, the positions of the PO1, the PO2, the PO3, the PO4 and the PO5 are fixed in any DRX.

Figure 5:
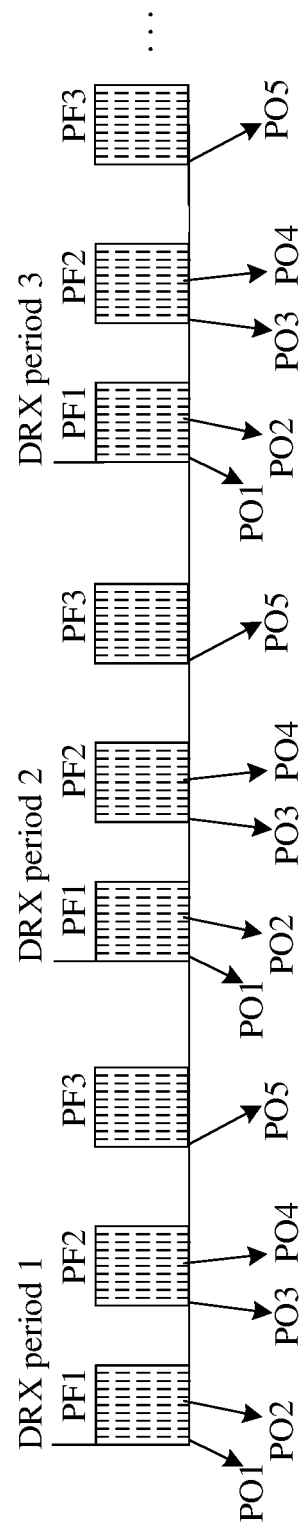

As shown in FIG. 5, one DRX includes three separated PFs, i.e., a PF1, a PF2 and a PF3, respectively, positions of a PO in the PF1, the PF2 and the PF3 can be calculated according to the above formulas by taking the PF1, the PF2 and the PF3 as a whole, and positions of PO1, PO2, PO3, PO4 and PO5 in the PF1, the PF2 and the PF3 are obtained, and there was no overlap of any two POs of the PO1, the PO2, the PO3, the PO4 and the PO5. After the positions of the PO1, the PO2, the PO3, the PO4 and the PO5 are calculated, the positions of the PO1, the PO2, the PO3, the PO4 and the PO5 are fixed in any DRX.

Third Specific Embodiment

In this embodiment, communication resources of other domains are used to separate POs of two consecutive paging messages.

A position of a PO of a paging message in a time-domain may be determined according to the method described in the above embodiment or a calculation method of the LTE, and at the same time, two consecutive paging messages are separated by communication resources of other domains. The communication resources of other domains include, but are not limited to, frequency-domain resources, spatial domain resources and code-domain resources. That is, when POs of two consecutive paging messages overlap on time-domain resources, or the POs of two consecutive paging messages do not overlap on the time-domain resources, the communication resources of the other domains are used to separate the two consecutive paging messages.

If two consecutive paging messages are separated by using the frequency-domain resources, different frequency-domain resources may be allocated for the two consecutive paging messages based on a UE_ID or a UE_ID group.

If two consecutive paging messages are separated by using the spatial domain resources, different frequency-domain resources may be allocated for the two consecutive paging messages based on a UE_ID or a UE_ID group. The spatial domain resources include, but are not limited to, beam resources, reference signal resources, physical resource block (PRB) resources, bandwidth parts (Bandwidth part, BWP) resources, band (Band) resources, and frequency-point resources. The reference signal resources include a single side band (Single Side Band, SSB), a channel state information reference signal (Channel State Information Reference Signal, CSI-RS), and a demodulation reference signal (Demodulation Reference Signal, DMRS).

If two consecutive POs are separated by using the code-domain resources, different codewords or groups may be allocated for the two consecutive paging messages based on a UE_ID or a UE_ID group.

Figure 6:
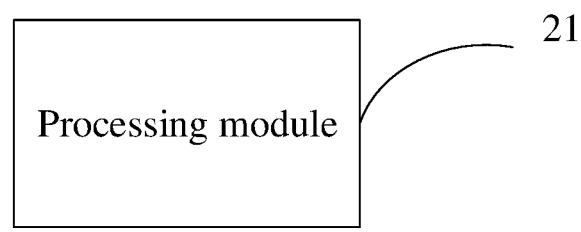
FIG. 6 is a structural block diagram of a communication device according to an embodiment of the present disclosure.

An embodiment of the present disclosure also provides a communication device, as shown in FIG. 6. The communication device includes a processing module 21.

The processing module 21 is used for determining a position of a paging message on a communication resource, where the position causes paging occasions of two consecutive paging messages to use different communication resources, and the communication resource includes at least one of the following: a time-domain resource; a frequency-domain resource; a spatial domain resource; a code-domain resource.

The communication device may be a network-side device or a user device.

In this embodiment, the position of the paging message on the communication resources is determined, and the same communication resource are avoided from being used for the paging occasions of two consecutive paging messages, the communication resources include time-domain resources, frequency-domain resource, spatial domain resources and code-domain resources. Through the technical solution of the present disclosure, overlapping of two consecutive paging messages can be avoided, so as to avoid that a user equipment cannot correctly receive data due to paging collision.

Further, the processing module 21 specifically performs at least one of the following: determining a position of a paging occasion of a paging message on a time-domain resource, and avoiding overlapping of paging occasions of two consecutive paging messages on time-domain resources; allocating different frequency-domain resources for the two consecutive paging messages; allocating different spatial domain resources for the two consecutive paging messages; allocating different code-domain resources for the two consecutive paging messages.

Further, the processing module 21 includes: a first determining submodule, used for determining the position of the paging occasion of the paging message on the time-domain resource according to a duration of the paging occasion of the paging message, and avoiding overlapping of paging occasions of the two consecutive paging messages on the time-domain resource; a second determining submodule, used for determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource.

Further, the original position includes an original starting position.

The second determining submodule is specifically used for: if a duration of a paging occasion of a previous paging message occupies the original starting position of a paging occasion of a next paging message, changing the starting position of the paging occasion of the next paging message to one of the following: a first subframe or a first slot available for transmitting a paging message next to an end of the paging occasion of the previous paging message; a first subframe or a first slot available for transmitting the paging message next to an end of the paging occasion of the previous paging message.

Further, beam-sweeping is performed in the paging occasion of the paging message on the occupied communication resource.

The beam-sweeping in the paging occasion of the paging message enables occupation of a sub-frame or slot other than a sub-frame or a slot available for transmitting a paging message, or the beam-sweeping in the paging occasion of the paging message enables only occupation of a sub-frame or a slot other than a sub-frame or a slot available for transmitting a paging message.

Further, the processing module 21 includes a third calculating submodule, used for determining identification information i_s of time-domain positions of paging occasions of a paging message within all paging frames of a discontinuous reception period; determining a position of the paging occasion on the time-domain resource according to mapping relationship between the identification information i_s of the time-domain position and the position or the starting position of the paging occasion; wherein the identification information i_s of the time-domain position of the paging occasion of the paging message within all paging frames of a discontinuous reception period is calculated in at least one of the following manners: 1) calculating a first ratio of an identifier of a user equipment to a first quantity, the first quantity being a minimum of a paging density and a discontinuous reception period; after rounding down the first ratio, performing a modulus operation on a sum of the positions of the paging occasions in all paging frames in the discontinuous reception period to obtain identification information i_s of a time-domain position of a paging occasion; 2) calculating a first ratio of the identifier of the user equipment to the first quantity, the first quantity being the minimum of the paging density and the discontinuous reception period, calculating the ratio of Ns to the duration of the paging occasion as a second ratio, and after rounding down the first ratio, performing a modulus operation on the second ratio being rounded up, to obtain the identification information i_s of the time-domain position of the paging occasion, wherein Ns is the maximum of 1 and a ratio of a paging density to a discontinuous reception period; 3) calculating a first ratio of the identifier of the user equipment to the first quantity, the first quantity being the minimum of the paging density and the discontinuous reception period; calculating the ratio of Ns to the duration of the paging occasion as a second ratio, and after rounding down the first ratio, performing a modulus operation on the second ratio being rounded down, to obtain the identification information i_s of the time-domain position of the paging occasion.

The third calculating submodule is further used for: superimposing a preset offset on the identification information i_s of the time-domain position or the mapped position of the paging occasion, to obtain the position of the paging occasion on time-domain resources, wherein a method of obtaining the offset includes at least one of the following: explicit or implicit configuration by a network-side device; calculation using the identifier of the user equipment; determining according to a paging order.

Further, the sum of positions of a paging occasion within all paging frames within a discontinuous reception period is determined accord to the duration of the paging occasion.

Further, the processing module 21 is specifically used for: allocating different frequency-domain resources for the two consecutive paging messages according to the identifier of the user equipment or an identifier of a group in which the user equipment is located.

Further, the processing module 21 is specifically used for: allocating different spatial domain resources for the two consecutive paging messages according to the identifier of the user equipment or the identifier of a group in which the user equipment is located, wherein the spatial domain resources include at least one of the following: a beam resource, a reference signal resource, a PRB resource, a BWP resource, a Band resource, a frequency point resource.

Further, the processing module 21 is specifically used for: allocating different code words or different groups to the two consecutive paging messages according to an identifier of a user equipment or an identifier of a group in which a user equipment is located.

Further, a method of obtaining the duration of the paging occasion includes at least one of the following: configuration from a network-side device; determining by a user equipment according to a beam-sweeping pattern; determining by a user equipment according to a configured paging parameter.

Further, when the communication equipment is a user equipment, the communication device further includes a sending module used for: after determining the duration of the paging occasion, reporting the duration of the paging occasion to the network-side device.

Embodiments of the present disclosure also provide a network-side device. The network-side device includes a storage, a processor, and a computer program stored on the storage and executable by the processor, wherein the computer program, when executed by the processor, implements the steps of the method of determining the position of a paging message as described above.

Figure 7:
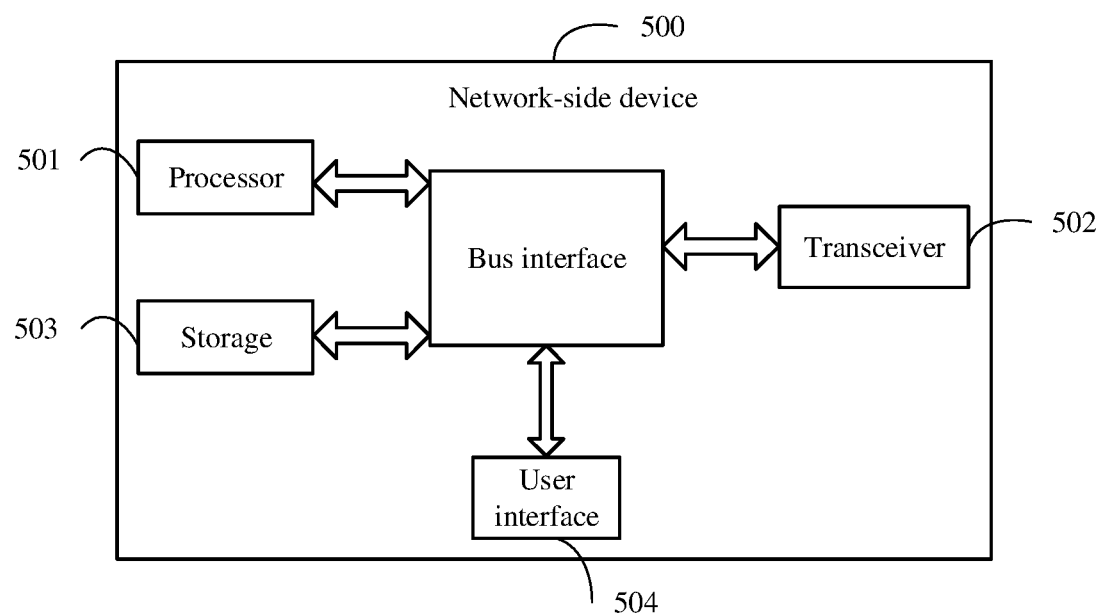
FIG. 7 is a schematic composition diagram of a network-side device according to an embodiment of the present disclosure.

Referring to FIG. 7, FIG. 7 is a structural diagram of a network-side device applied in an embodiment of the present disclosure, and can implement the details of the method of determining the position of a paging message in the above embodiments, and achieve the same effect. As shown in FIG. 7, the network-side device 500 includes a processor 501, a transceiver 502, a storage 503, a user interface 504, and a bus interface, wherein, in an embodiment of that present disclosure, the network-side device 500 further includes a computer program stored on the storage 503 and executable by the processor 501. The computer program, when executed by the processor 501, implements following steps: determining a position of a paging message on a communication resource, where the position causes paging occasions of two consecutive paging messages to use different communication resources, and the communication resource includes at least one of the following: a time-domain resource; a frequency-domain resource; a spatial domain resource; a code-domain resource.

In FIG. 7, a bus architecture may include any number of interconnected buses and bridges, specifically various circuits such as one or more processors represented by the processor 501 and a memory represented by the storage 503 are linked together. The bus architecture may also link together various other circuits, such as peripheral devices, voltage regulators, and power management circuits, which are well known in the art, and thus will not be described further herein. The bus interface provides an interface. The transceiver 502 may be a plurality of elements, i.e., including a transmitter and a receiver, for providing elements for communicating with various other devices over a transmission medium. For different user equipments, the user interface 504 may also be an interface capable of internally or externally connecting a necessary device. A connected device includes, but is not limited to, a keypad, a display, a microphone, a speaker, a joystick, and the like.

The processor 501 is responsible for managing the bus architecture and general processing, and the storage 503 may store data used by the processor 501 when performing operations.

Further, the processor 501 is specifically used for performing at least one of the following: determining a position of a paging occasion of a paging message on a time-domain resource, and avoiding overlapping of paging occasions of two consecutive paging messages on time-domain resources; allocating different frequency-domain resources for the two consecutive paging messages; allocating different spatial domain resources for the two consecutive paging messages; allocating different code-domain resources for the two consecutive paging messages.

Further, the processor 501 is specifically used for: determining the position of the paging occasion of the paging message on the time-domain resource according to a duration of the paging occasion of the paging message, and avoiding overlapping of paging occasions of the two consecutive paging messages on the time-domain resource; or determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource.

Further, the original position includes an original starting position, and the processor 501 is specifically used for: if a duration of a paging occasion of a previous paging message occupies the original starting position of a paging occasion of a next paging message, changing the starting position of the paging occasion of the next paging message to one of the following: a first subframe or a first slot available for transmitting a paging message next to an end of the paging occasion of the previous paging message ends; a first subframe or a first slot available for transmitting the paging message next to an end of the paging occasion of the previous paging message.

Further, beam-sweeping is performed in the paging occasion of the paging message on the occupied communication resource.

The beam-sweeping in the paging occasion of the paging message enables occupation of a sub-frame or slot other than a sub-frame or a slot available for transmission of a paging message, or the beam-sweeping in the paging occasion of the paging message enables only occupation of a sub-frame or a slot other than a sub-frame or a slot available for transmission of a paging message.

Further, the processor 501 is specifically used for: determining identification information i_s of a time-domain position of the paging occasion of the paging message within all paging frames of a discontinuous reception period; determining a position of the paging occasion on the time-domain resource according to mapping relationship between the identification information i_s of the time-domain position and the position or the starting position of the paging occasion; wherein the identification information i_s of the time-domain position of the paging occasion of the paging message within all paging frames of a discontinuous reception period is calculated in at least one of the following manners: 1) calculating a first ratio of an identifier of a user equipment to a first quantity, the first quantity being a minimum of a paging density and a discontinuous reception period; after rounding down the first ratio, performing a modulus operation on a sum of the positions of the paging occasions in all paging frames in the discontinuous reception period to obtain identification information i_s of a time-domain position of a paging occasion; 2) calculating a first ratio of the identifier of the user equipment to the first quantity, the first quantity being the minimum of the paging density and the discontinuous reception period, calculating the ratio of Ns to the duration of the paging occasion as a second ratio, and after rounding down the first ratio, performing a modulus operation on the second ratio being rounded up, to obtain the identification information i_s of the time-domain position of the paging occasion, wherein Ns is the maximum of 1 and a ratio of a paging density to a discontinuous reception period; 3) calculating a first ratio of the identifier of the user equipment to the first quantity, the first quantity being the minimum of the paging density and the discontinuous reception period; calculating the ratio of Ns to the duration of the paging occasion as a second ratio, and after rounding down the first ratio, performing a modulus operation on the second ratio being rounded down, to obtain the identification information i_s of the time-domain position of the paging occasion.

Further, the processor 501 is further used for: superimposing a preset offset on the identification information i_s of the time-domain position or the mapped position of the paging occasion, to obtain the position of the paging occasion on time-domain resources, wherein a method of obtaining the offset includes at least one of the following: explicit or implicit configuration by a network-side device; calculation using the identifier of the user equipment; determining according to a paging order.

Further, the sum of positions of a paging occasion within all paging frames within a discontinuous reception period is determined accord to the duration of the paging occasion.

Further, the processor 501 is specifically used for: allocating different frequency-domain resources for the two consecutive paging messages according to the identifier of the user equipment or an identifier of a group in which the user equipment is located.

Further, the processor 501 is specifically used for: allocating different spatial domain resources for the two consecutive paging messages according to the identifier of the user equipment or the identifier of a group in which the user equipment is located, wherein the spatial domain resources include at least one of the following: a beam resource, a reference signal resource, a PRB resource, a BWP resource, a Band resource, a frequency point resource.

Further, the processor 501 is specifically used for: allocating different codewords or different groups to the two consecutive paging messages according to an identifier of a user equipment or an identifier of a group in which a user equipment is located.

Further, a method of obtaining the duration of the paging occasion includes at least one of the following: configuration from a network-side device; determining by a user equipment according to a beam-sweeping pattern; determining by a user equipment according to a configured paging parameter.

Further, after the user equipment determines the duration of the paging occasion, the duration of the paging occasion is reported to the network-side device.

Embodiments of the present disclosure also provide a user equipment. The user equipment includes a storage, a processor, and a computer program stored on the storage and executable by the processor, wherein the computer program, when executed by the processor, implements the steps of the method of determining the position of a paging message as described above.

Figure 8:
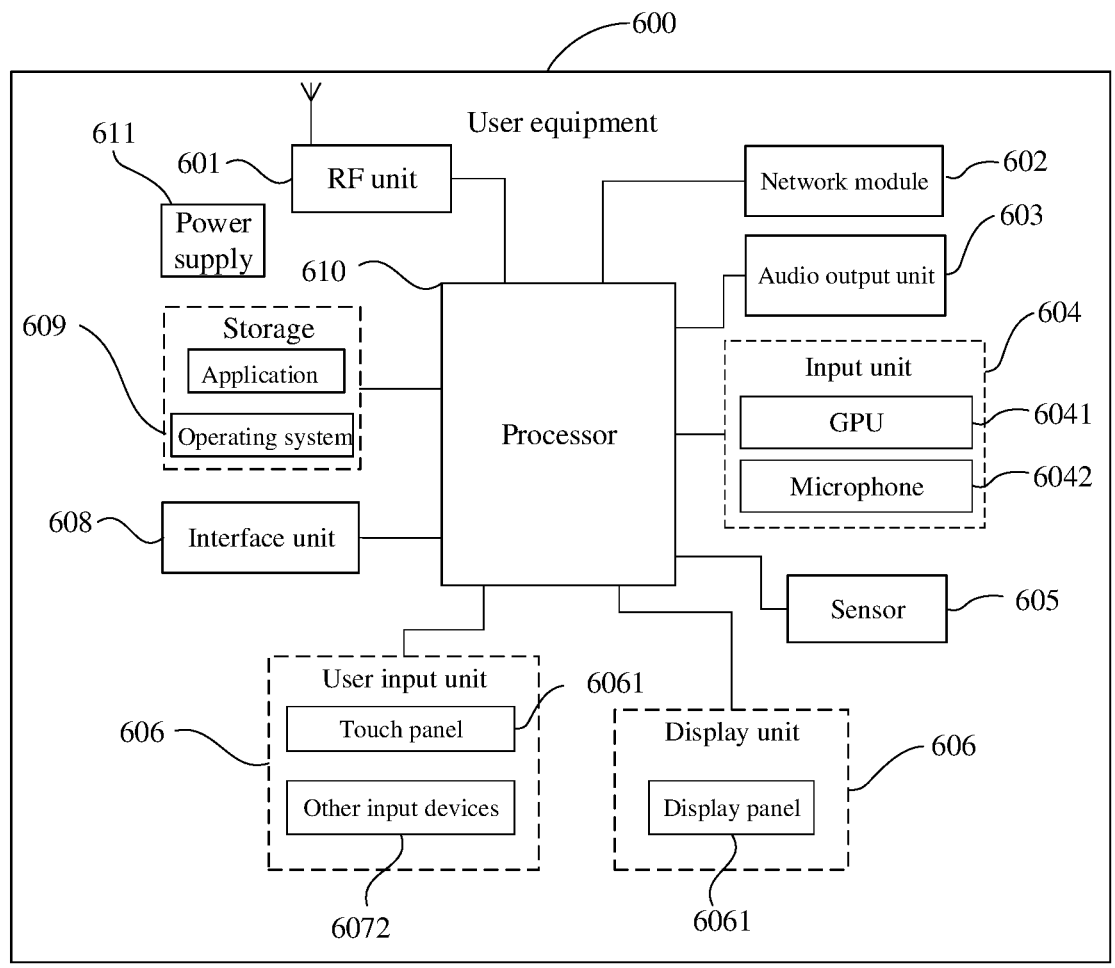
FIG. 8 is a composition diagram of a user equipment according to an embodiment of the present disclosure.

FIG. 8 is a schematic diagram of a hardware structure of a user equipment implementing various embodiments of the present disclosure. Referring to FIG. 8, the user equipment 600 includes, but is not limited to, a radio frequency unit 601, a network module 602, an audio output unit 603, an input unit 604, a sensor 605, a display unit 606, a user input unit 606, an interface unit 608, a storage 609, a processor 610, and a power supply 611 and other components. Those skilled in the art may understand that the user equipment shown in FIG. 8 may include more or fewer components than shown in the figure, or some combined components, or different arrangements of components. In some embodiments of the present disclosure, the user equipment includes, but is not limited to, a mobile phone, a tablet computer, a notebook computer, a palmtop computer, a vehicle-mounted terminal, a wearable device, a pedometer, and the like.

The processor 610 is used for: determining a position of a paging message on a communication resource, where the position causes paging occasions of two consecutive paging messages to use different communication resources, and the communication resource includes at least one of the following: a time-domain resource; a frequency-domain resource; a spatial domain resource; a code-domain resource.

Further, the processor 610 is specifically used for performing at least one of the following: determining a position of a paging occasion of a paging message on a time-domain resource, and avoiding overlapping of paging occasions of two consecutive paging messages on time-domain resources; allocating different frequency-domain resources for the two consecutive paging messages; allocating different spatial domain resources for the two consecutive paging messages; allocating different code-domain resources for the two consecutive paging messages.

Further, the processor 610 is specifically used for: determining the position of the paging occasion of the paging message on the time-domain resource according to a duration of the paging occasion of the paging message, and avoiding overlapping of paging occasions of the two consecutive paging messages on the time-domain resource; or determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource.

Further, the original position includes an original starting position.

The processor 610 is specifically used for: if a duration of a paging occasion of a previous paging message occupies the original starting position of a paging occasion of a next paging message, changing the starting position of the paging occasion of the next paging message to one of the following: a first subframe or a first slot available for transmitting a paging message next to an end of the paging occasion of the previous paging message; a first subframe or a first slot available for transmitting the paging message next to an end of the paging occasion of the previous paging message.

Further, beam-sweeping is performed in the paging occasion of the paging message on the occupied communication resource.

The beam-sweeping in the paging occasion of the paging message enables occupation of a sub-frame or slot other than a sub-frame or a slot available for transmission of a paging message, or the beam-sweeping in the paging occasion of the paging message enables only occupation of a sub-frame or a slot other than a sub-frame or a slot available for transmission of a paging message.

Further, the processor 610 is specifically used for: determining identification information $i\_s$ of a time-domain position of the paging occasion of the paging message within all paging frames of a discontinuous reception period; determining a position of the paging occasion on the time-domain resource according to mapping relationship between the identification information $i\_s$ of the time-domain position and the position or the starting position of the paging occasion; wherein the identification information $i\_s$ of the time-domain position of the paging occasion of the paging message within all paging frames of a discontinuous reception period is calculated in at least one of the following manners: 1) calculating a first ratio of an identifier of a user equipment to a first quantity, the first quantity being a minimum of a paging density and a discontinuous reception period; after rounding down the first ratio, performing a modulus operation on a sum of the positions of the paging occasions in all paging frames in the discontinuous reception period to obtain identification information $i\_s$ of a time-domain position of a paging occasion; 2) calculating a first ratio of the identifier of the user equipment to the first quantity, the first quantity being the minimum of the paging density and the discontinuous reception period, calculating the ratio of Ns to the duration of the paging occasion as a second ratio, and after rounding down the first ratio, performing a modulus operation on the second ratio being rounded up, to obtain the identification information $i\_s$ of the time-domain position of the paging occasion, wherein Ns is the maximum of 1 and a ratio of a paging density to a discontinuous reception period; 3) calculating a first ratio of the identifier of the user equipment to the first quantity, the first quantity being the minimum of the paging density and the discontinuous reception period; calculating the ratio of Ns to the duration of the paging occasion as a second ratio, and after rounding down the first ratio, performing a modulus operation on the second ratio being rounded down, to obtain the identification information $i\_s$ of the time-domain position of the paging occasion.

Further, the processor 610 is further used for: superimposing a preset offset on the identification information $i\_s$ of the time-domain position or the mapped position of the paging occasion, to obtain the position of the paging occasion on time-domain resources, wherein a method of obtaining the offset includes at least one of the following: explicit or implicit configuration by a network-side device; calculation using the identifier of the user equipment; determining according to a paging order.

Further, the sum of positions of a paging occasion within all paging frames within a discontinuous reception period is determined accord to the duration of the paging occasion.

Further, the processor 610 is specifically used for: allocating different frequency-domain resources for the two consecutive paging messages according to the identifier of the user equipment or an identifier of a group in which the user equipment is located.

Further, the processor 610 is specifically used for: allocating different spatial domain resources for the two consecutive paging messages according to the identifier of the user equipment or the identifier of a group in which the user equipment is located, wherein the spatial domain resources include at least one of the following: a beam resource, a reference signal resource, a PRB resource, a BWP resource, a Band resource, a frequency point resource.

Further, the processor 610 is specifically used for: allocating different codewords or different groups to the two consecutive paging messages according to an identifier of a user equipment or an identifier of a group in which a user equipment is located.

Further, a method of obtaining the duration of the paging occasion includes at least one of the following: configuration from a network-side device; determining by a user equipment according to a beam-sweeping pattern; determining by a user equipment according to a configured paging parameter.

Further, after the user equipment determines the duration of the paging occasion, the duration of the paging occasion is reported to the network-side device.

It should be understood that, in the embodiment of the present disclosure, the radio frequency unit 601 is used for receiving and transmitting signals in processes of transmitting and receiving information or talking. Specifically, after the radio frequency unit 601 receives downlink data from the base station, and the downlink data is transferred by the radio frequency unit 601 to the processor 610 for processing; and additionally the radio frequency unit 601 sends uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may also communicate with a network and other devices through a wireless communication system.

The user equipment provides a wireless broadband internet access to a user through the network module 602, such as helping the user to send and receive emails, browse web pages, access streaming media, and the like.

The audio output unit 603 may convert audio data received by the radio frequency unit 601 or the network module 602 or stored in the storage 609 into an audio signal and output the audio signal as sound. The audio output unit 603 may also provide audio output (e.g., a call signal reception sound, a message reception sound, etc.) related to a specific function performed by the user equipment 600. The audio output unit 603 includes a speaker, a buzzer, a receiver, and the like.

The input unit 604 is used to receive an audio or video signal. The input unit 604 may include a Graphics Processing Unit (GPU) 6041 and a microphone 6042. The graphics processing unit 6041 processes image data of a still picture or a video obtained by an image capturing device such as a camera in a video capturing mode or an image capturing mode. The processed image frame may be displayed on the display unit 606. Image frames processed by the graphics processing unit 6041 may be stored in the storage 609 (or other storage media) or sent via the radio frequency unit 601 or the network module 602. The microphone 6042 may receive sound and be able to process such sound into audio data. The processed audio data may be converted, in a case of a telephone communication mode, into a format output that may be sent to a mobile communication base station via the radio frequency unit 601.

The user equipment 600 also includes at least one sensor 605, such as a light sensor, a motion sensor, and other sensors. In particular, the light sensor includes an ambient light sensor and a proximity sensor, wherein the ambient light sensor may adjust brightness of the display panel 6061 according to brightness of ambient light. The proximity sensor may turn off the display panel 6061 and/or a backlight when the user equipment 600 moves close to the ear. As one type of motion sensor, the accelerometer sensor can detect a value of an acceleration in each direction (generally the three axes directions), and can detect a magnitude and a direction of gravity when being stationary, can be used to recognize a posture of a user equipment (such as horizontal-vertical screen switching, a related game, a magnetometer posture calibration), a vibration-recognition related function (such as a pedometer, tapping), and the like. The sensor 605 may further include a fingerprint sensor, a pressure sensor, an iris sensor, a molecular sensor, a gyroscope, a barometer, a hygrometer, a thermometer, an infrared sensor, and the like, which will not be described herein.

The display unit 606 is used to display information inputted by the user or information provided to the user. The display unit 606 may include a display panel 6061 that may be configured in the form of a Liquid Crystal Display (LCD), an Organic Light-Emitting Diode (OLED), or the like.

The user input unit 607 may be used to receive inputted digital or character information and generate a key signal input related to user-setting and function control of the user equipment. Specifically, the user input unit 607 includes a touch panel 6071 and other input devices 6072. The touch panel 6071, also referred to as a touch screen, may collect a touch operation (e.g., an operation of a user using any suitable object or accessory, such as a finger, stylus, or the like, on or near the touch panel 6071) of the user on or near the touch panel 6071. The touch panel 6071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 610, and receives and executes commands from the processor 610. In addition, the touch panel 6071 may be implemented in various types such as a resistance type, a capacitance type, an infrared ray, and a surface acoustic wave. The user input unit 607 may also include other input devices 6072 in addition to the touch panel 6071. Specifically, the other input devices 6072 may include, but are not limited to, a physical keyboard, function keys (such as volume control keys, switch keys, etc.), a trackball, a mouse, and a joystick, which will not be described herein.

Further, the touch panel 6071 may be overlaid on the display panel 6061, and after the touch panel 6071 detects a touch operation on or near the touch panel 6071, the touch operation is sent by touch panel 6071 to the processor 610 to determine the type of a touch event. The processor 610 then provides a corresponding visual output on the display panel 6061 according to the type of the touch event. Although in FIG. 8, the touch panel 6071 and the display panel 6061 are two separate components for implementing input and output functions of the user equipment, the input and output functions of the user equipment in some embodiments may be realized by integrating the touch panel 6071 with the display panel 6061, and the present disclosure is not limited thereto.

The interface unit 608 is an interface in which an external device is connected to the user equipment 600. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 608 may be used to receive input (e.g., data information, power, etc.) from an external device and transmit the received input to one or more elements within the user equipment 600 or may be used to transmit data between the user equipment 600 and the external device.

The storage 609 may be used to store software programs and various types of data. The storage 609 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 609 may include a high speed random access memory, and may also include a non-transitory memory, such as at least one disk storage device, a flash memory device, or other volatile solid state storage device.

The processor 610 is a console of the user equipment, connects various parts of the entirety of the user equipment using various interfaces and lines, and executes various functions and processes data of the user equipment by running or executing software programs and/or modules stored in the storage 609, and by calling data stored in the storage 609, thereby integrally monitoring the user equipment. The processor 610 may include one or more processing units; optionally, the processor 610 may integrate an application processor and a modem processor, wherein the application processor primarily processes an operating system, a user interface, an application program, etc. The modem processor mainly handles wireless communication. It will be appreciated that the above-described modem processor may also not be integrated into the processor 610.

The user equipment 600 may also include a power supply 611 (such as a battery) that supplies power to various components, optionally, the power supply 611 may be logically connected to the processor 610 via a power management system. Thus, functions such as charging, discharging, and power consumption management are managed by the power management system.

In addition, the user equipment 600 includes some functional modules not shown, which will not be described here.

Embodiments of the present disclosure also provide a computer readable storage medium having a computer program stored thereon, wherein the computer program, when executed by a processor, implements the steps of the method of determining the position of a paging message as described above.

It will be appreciated that the embodiments described in the present disclosure may be implemented in hardware, software, firmware, middleware, a microcode, or a combination thereof. For hardware implementation, a processing unit may be implemented in one or more of an application specific integrated circuit (Application Specific Integrated Circuit, ASIC), a digital signal processor (Digital Signal Processor, DSP), a digital signal processing device (DSP Device, DSPD), a programmable logic device (Programmable Logic Device, PLD), a field-programmable gate array (Field-Programmable Gate Array, FPGA), a general purpose processor, a controller, a microcontroller, a microprocessor, other electronic units for performing the functions described in the present disclosure, or a combination thereof.

For software implementation, techniques described in some embodiments of the present disclosure may be implemented by modules (e.g., processes, functions, etc.) that perform the functions described in some embodiments of the disclosure. A software code may be stored in a storage and executed by a processor. The storage may be implemented in the processor or external to the processor.

The embodiments in this specification are described in a progressive manner, and each embodiment is focused on difference from other embodiments, and the same or similar parts in the embodiments can be obtained by referring to each other.

Those skilled in the art will appreciate that the embodiments of the present disclosure may be provided as a method, an apparatus, or a computer program product. Accordingly, embodiments of the present disclosure may take forms of an entire hardware embodiment, an entire software embodiment, or an embodiment combining software and hardware aspects. The embodiments of the present disclosure may employ a form of a computer program produce implemented on one or more computer usable storage media (including, but not limited to, a magnetic disk storage, a CD-ROM, an optical memory, etc.) including a computer usable program code.

Embodiments of the present disclosure are described with reference to flow charts and/or block diagrams of methods, user equipments (systems), and computer program products according to embodiments of the disclosure. It is to be understood that each flow and/or block in the flow charts or block diagrams or a combination a flow and/or a block in the flow charts or block diagrams may be implemented by computer program instructions. These computer program instructions may be provided to a processor of a general purpose computer, a special purpose computer or an embedded processor or another programmable data-processing user equipment to produce a machine, so that when the computer program instructions are executed by a processor of a computer or other programmable data-processing user equipment, a device is generated for implementing functions specified in one or more flows in the flow charts and/or one or more blocks in the block diagrams.

These computer program instructions may also be stored in a computer readable storage capable of directing a computer or other programmable data-processing user equipment to operate in a particular manner, so that instructions stored in the computer readable storage produce an article of manufacture including an instruction device which implements the functions specified in one or more flows in the flow charts and/or one or more blocks in the block diagrams.

These computer program instructions may also be loaded onto a computer or other programmable data-processing user equipment such that a series of operational steps are performed on the computer or the other programmable user equipment to produce a computer-implemented process, so that the instructions executed on the computer or the other programmable user equipment provide the steps for implementing the functions specified in one or more flows in the flow charts and/or one or more blocks in the block diagrams.

Although optional embodiments of the present have been described, additional changes and modifications may be made to these embodiments once those skilled in the art have learned basic inventive concepts. Therefore, the appended claims are intended to be construed as including the optional embodiments and all alterations and modifications that fall within the scope of the embodiments of the present disclosure.

It should also be noted that relational terms such as first and second, etc. are used herein only to distinguish one entity or operation from another entity or operation, but does not necessarily require or imply any such actual relationship or order between such entities or operations. Moreover, such terms as "including", "comprising" or any other variation thereof are intended to encompass non-exclusive inclusions such that a process, method, article or user equipment including a series of elements includes not only those elements, but also other elements that are not explicitly listed, or elements inherent to such a process, method, article or user equipment. An element after a statement "including" does not exclude presence of further identical elements in the process, method, article or user equipment that includes the element, if without further limitation.

The foregoing is optional embodiments of the present disclosure, and it should be noted that several modifications and embellishments may be made by those of ordinary skill in the art without departing from the principles set forth herein. Such modifications and embellishments are also within the protection scope of the present disclosure.

What is claimed is:

1. A method of determining a position of a paging message, comprising:
   determining a position of a paging message on a communication resource, where the position causes paging occasions of two consecutive paging messages to use different communication resources, and the communication resource comprises at least one of following: a time-domain resource, a frequency-domain resource, a spatial domain resource, a code-domain resource,
   wherein, determining the position of the paging message on the communication resource comprises at least one of following:
      determining the position of the paging occasion of the paging message on a time-domain resource, and avoiding overlapping of paging occasions of two consecutive paging messages on a time-domain resource;
      allocating different frequency-domain resources for the two consecutive paging messages;
      allocating different spatial domain resources for the two consecutive paging messages;
      allocating different code-domain resources for the two consecutive paging messages,
      wherein, determining the position of the paging occasion of the paging message on the time-domain resource comprises:
         determining the position of the paging occasion of the paging message on the time-domain resource according to a duration of the paging occasion of the paging message, and avoiding overlapping of paging occasions of the two consecutive paging messages on the time-domain resource; or
         determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource;
   or,
      wherein determining the position of the paging occasion of the paging message on the time-domain resource comprises:
         determining identification information i_s of a time-domain position of the paging occasion of the paging message within all paging frames of a discontinuous reception period;
         determining the position of the paging occasion on the time-domain resource according to mapping relationship between the identification information i_s of the time-domain position and a position or a starting position of the paging occasion;
      wherein the identification information i_s of the time-domain position of the paging occasion of the paging message within all paging frames of a discontinuous reception period is determined in at least one of following manners:
         1) calculating a first ratio of an identifier of a user equipment to a first quantity, the first quantity being a minimum of a paging density and a discontinuous reception period; after rounding down the first ratio, performing a modulus operation on a sum of positions of paging occasions in all paging frames in a discontinuous reception period to obtain the identification information i_s of the time-domain position of the paging occasion;
         2) calculating a first ratio of an identifier of a user equipment to a first quantity, the first quantity being a minimum of a paging density and a discontinuous reception period, calculating a ratio of Ns to a duration of a paging occasion as a second ratio, and after rounding down the first ratio, performing a modulus operation on the second ratio being rounded up, to obtain the identification information i_s of the time-domain position of the paging occasion, wherein Ns is a maximum of 1 and a ratio of a paging density to a discontinuous reception period;
         3) calculating a first ratio of an identifier of a user equipment to a first quantity, the first quantity being a minimum of a paging density and a discontinuous reception period; calculating a ratio of Ns to a duration of a paging occasion as a second ratio, and after rounding down the first ratio, performing a modulus operation on the second ratio being rounded down, to obtain the identification information i_s of the time-domain position of the paging occasion.

2. The method of determining a position of a paging message according to claim 1, wherein, in case of determining the position of the paging occasion of the paging message on the time-domain resource according to the duration of the paging occasion of the paging message, or in case of determining the original position of the paging occasion of the paging message on the time-domain resource according to the duration of the paging occasion of the paging message,
   the original position comprises an original starting position, and adjusting the position of the paging occasion of the paging message on the time-domain resource comprises:
      if a duration of a paging occasion of a previous paging message occupies the original starting position of a paging occasion of a next paging message, changing a starting position of a paging occasion of the next paging message to one of following:
         a first subframe or a first slot available for transmitting a paging message next to an end of the paging occasion of the previous paging message;

a first subframe or a first slot available for transmitting the paging message next to an end of the paging occasion of the previous paging message.

3. The method of determining a position of a paging message according to claim 1, wherein beam-sweeping is performed in a paging occasion of a paging message on an occupied communication resource, the beam-sweeping in the paging occasion of the paging message enables occupation of a sub-frame or slot other than a sub-frame or a slot available for transmission of a paging message, or the beam-sweeping in the paging occasion of the paging message enables only occupation of a sub-frame or a slot other than a sub-frame or a slot available for transmission of a paging message.

4. The method of determining a position of a paging message according to claim 1, wherein, in case of determining the identification information $i\_s$ of the time-domain position of the paging occasion of the paging message within all paging frames of the discontinuous reception period, the method further comprises:

superimposing a preset offset on the identification information is of the time-domain position or on a mapped position of a paging occasion, to obtain the position of the paging occasion on the time-domain resource, wherein a method of obtaining the offset comprises at least one of following:

explicit or implicit configuration by a network-side device, calculation using an identifier of an user equipment, determining according to a paging order.

5. The method of determining a position of a paging message according to claim 1, wherein, in case of determining the identification information $i\_s$ of the time-domain position of the paging occasion of the paging message within all paging frames of the discontinuous reception period, a sum of positions of paging occasions within all paging frames within a discontinuous reception period is determined accord to a duration of a paging occasion.

6. The method of determining a position of a paging message according to claim 1, wherein allocating different frequency-domain resources for the two consecutive paging messages comprises:

allocating different frequency-domain resources for the two consecutive paging messages according to an identifier of a user equipment or an identifier of a group in which the user equipment is located.

7. The method of determining a position of a paging message according to claim 1, wherein allocating different spatial domain resources for the two consecutive paging messages comprises:

allocating different spatial domain resources for the two consecutive paging messages according to an identifier of a user equipment or an identifier of a group in which the user equipment is located, wherein the spatial domain resources comprise at least one of following:

a beam resource, a reference signal resource, a physical resource block PRB resource, a bandwidth part BWP resource, a baseband Band resource, a frequency point resource.

8. The method of determining a position of a paging message according to claim 1, wherein allocating different code-domain resources for the two consecutive paging messages comprises:

allocating different codewords or different groups to the two consecutive paging messages according to an identifier of a user equipment or an identifier of a group in which the user equipment is located.

9. The method of determining the position of a paging message according to claim 1, wherein, in case of determining the position of the paging occasion of the paging message on the time-domain resource according to the duration of the paging occasion of the paging message, or in case of determining the original position of the paging occasion of the paging message on the time-domain resource according to the duration of the paging occasion of the paging messages, a method of obtaining a duration of the paging occasion comprises at least one of following:

configuration from a network-side device;

determining by a user equipment according to a beam-sweeping pattern;

determining by a user equipment according to a configured paging parameter.

10. The method of determining a position of a paging message according to claim 9, wherein, after the user equipment determines the duration of the paging occasion, the duration of the paging occasion is reported to a network-side device.

11. A non-transitory computer readable storage medium in which a computer program is stored, wherein, when the computer program is executed by a processor, the processor implements the steps of the method of determining a position of a paging message according to claim 1.

12. A communication device, comprising:

a storage, a processor and a computer program stored on the storage and executable by the processor, wherein when the computer program is executed by the processor, the processor implements a method of determining a position of a paging message, the method comprises determining a position of a paging message on a communication resource, where the position causes paging occasions of two consecutive paging messages to use different communication resources, and the communication resource comprises at least one of following:

a time-domain resource, a frequency-domain resource, a spatial domain resource, a code-domain resource, wherein, determining the position of the paging message on the communication resource comprises at least one of following:

determining the position of the paging occasion of the paging message on a time-domain resource, and avoiding overlapping of paging occasions of two consecutive paging messages on a time-domain resource;

allocating different frequency-domain resources for the two consecutive paging messages;

allocating different spatial domain resources for the two consecutive paging messages;

allocating different code-domain resources for the two consecutive paging messages, wherein, determining the position of the paging occasion of the paging message on the time-domain resource comprises:

determining the position of the paging occasion of the paging message on the time-domain resource according to a duration of the paging occasion of the paging message, and avoiding overlapping of paging occasions of the two consecutive paging messages on the time-domain resource; or determining an original position of the paging occasion of the paging message on the time-domain resource according to a duration of the paging occasion of the paging message, and if original positions of paging occasions of the two consecutive paging messages on the time-domain resource overlap, adjusting the position of the paging occasion of the paging message on the time-domain resource so as to avoid overlapping of the paging occasions of the two consecutive paging messages on the time-domain resource;

or, wherein determining the position of the paging occasion of the paging message on the time-domain resource comprises:

determining identification information i_s of a time-domain position of the paging occasion of the paging message within all paging frames of a discontinuous reception period;

determining the position of the paging occasion on the time-domain resource according to mapping relationship between the identification information i_s of the time-domain position and a position or a starting position of the paging occasion;

wherein the identification information i_s of the time-domain position of the paging occasion of the paging message within all paging frames of a discontinous reception period is determined in at least one of following manners:

1) calculating a first ratio of an identifier of a user equipment to a first quantity, the first quantity being a minimum of a paging density and a discontinuous reception period; after rounding down the first ratio, performing a modulus operation on a sum of positions of paging occasions in all paging frames in a discontinuous reception period to obtain the identification information i_s of the time-domain position of the paging occasion;

2) calculating a first ratio of an identifier of a user equipment to a first quantity, the first quantity being a minimum of a paging density and a discontinuous reception period, calculating a ratio of Ns to a duration of a paging occasion as a second ratio, and after rounding down the first ratio, performing a modulus operation on the second ratio being rounded up, to obtain the identification information i_s of the time-domain position of the paging occasion, wherein Ns is a maximum of 1 and a ratio of a paging density to a discontinuous reception period;

3) calculating a first ratio of an identifier of a user equipment to a first quantity, the first quantity being a minimum of a paging density and a discontinuous reception period; calculating a ratio of Ns to a duration of a paging occasion as a second ratio, and after rounding down the first ratio, performing a modulus operation on the second ratio being rounded down, to obtain the identification information i_s of the time-domain position of the paging occasion.

13. The communication device according to claim 12, wherein, allocating different frequency-domain resources for the two consecutive paging messages comprises:
allocating different frequency-domain resources for the two consecutive paging messages according to an identifier of a user equipment or an identifier of a group in which the user equipment is located;

or, allocating different spatial domain resources for the two consecutive paging messages comprises:
allocating different spatial domain resources for the two consecutive paging messages according to an identifier of a user equipment or an identifier of a group in which the user equipment is located, wherein the spatial domain resources comprise at least one of following: a beam resource, a reference signal resource, a physical resource block PRB resource, a bandwidth part BWP resource, a baseband Band resource, a frequency point resource;

or, allocating different code-domain resources for the two consecutive paging messages comprises:
allocating different codewords or different groups to the two consecutive paging messages according to an identifier of a user equipment or an identifier of a group in which the user equipment is located.

14. The communication device according to claim 12, wherein, in case of determining the position of the paging occasion of the paging message on the time-domain resource according to the duration of the paging occasion of the paging message, or in case of determining the original position of the paging occasion of the paging message on the time-domain resource according to the duration of the paging occasion of the paging message, the original position comprises an original starting position, and adjusting the position of the paging occasion of the paging message on the time-domain resource comprises:
if a duration of a paging occasion of a previous paging message occupies the original starting position of a paging occasion of a next paging message, changing a starting position of a paging occasion of the next paging message to one of following:
a first subframe or a first slot available for transmitting a paging message next to an end of the paging occasion of the previous paging message;
a first subframe or a first slot available for transmitting the paging message next to an end of the paging occasion of the previous paging message.

15. The communication device according to claim 12, wherein, beam-sweeping is performed in a paging occasion of a paging message on an occupied communication resource, the beam-sweeping in the paging occasion of the paging message enables occupation of a sub-frame or slot other than a sub-frame or a slot available for transmission of a paging message, or
the beam-sweeping in the paging occasion of the paging message enables only occupation of a sub-frame or a slot other than a sub-frame or a slot available for transmission of a paging message.

16. The communication device according to claim 12, wherein, when the computer program is executed by the processor, the processor further implements: in case of determining the identification information i_s of the time-domain position of the paging occasion of the paging message within all paging frames of the discontinuous reception period, superimposing a preset offset on the identification information $i\_s$ of the time-domain position or on a mapped position of a paging occasion, to obtain the position of the paging occasion on the time-domain resource, wherein a method of obtaining the offset comprises at least one of following:

explicit or implicit configuration by a network-side device, calculation using an identifier of an user equipment, determining according to a paging order.

17. The communication device according to claim 12, wherein, in case of determining the identification information $i\_s$ of the time-domain position of the paging occasion of the paging message within all paging frames of the discontinuous reception period, a sum of positions of paging occasions within all paging frames within a discontinuous reception period is determined accord to a duration of a paging occasion.

18. The communication device according to claim 12, wherein, in case of determining the position of the paging occasion of the paging message on the time-domain resource according to the duration of the paging occasion of the paging message, or in case of determining the original position of the paging occasion of the paging message on the time-domain resource according to the duration of the paging occasion of the paging message, a method of obtaining a duration of the paging occasion comprises at least one of following:
configuration from a network-side device;
determining by a user equipment according to a beam-sweeping pattern;
determining by a user equipment according to a configured paging parameter.

19. The communication device according to claim 12, wherein, after the user equipment determines the duration of the paging occasion, the duration of the paging occasion is reported to a network-side device.

\* \* \* \* \*